(12) United States Patent
Bhatti et al.

(10) Patent No.: US 11,967,027 B2
(45) Date of Patent: *Apr. 23, 2024

(54) AUGMENTED REALITY SYSTEM FOR FITNESS

(71) Applicant: Peloton Interactive, Inc., New York, NY (US)

(72) Inventors: Abdurrahman Bin Shahzad Bhatti, Clyde Hill, WA (US); Jensen Rarig Steven Turner, Everett, WA (US); Xander E. Fries, Kirkland, WA (US)

(73) Assignee: Peloton Interactive, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/395,605

(22) Filed: Aug. 6, 2021

(65) Prior Publication Data

US 2022/0139045 A1 May 5, 2022

Related U.S. Application Data

(63) Continuation of application No. 16/533,061, filed on Aug. 6, 2019, now Pat. No. 11,087,544, which is a continuation of application No. 16/247,131, filed on Jan. 14, 2019, now Pat. No. 10,373,391.

(60) Provisional application No. 62/661,328, filed on Apr. 23, 2018.

(51) Int. Cl.
*G06T 19/00* (2011.01)
*G01S 19/47* (2010.01)
*G02B 27/01* (2006.01)
*G06T 13/40* (2011.01)

(52) U.S. Cl.
CPC ............ *G06T 19/006* (2013.01); *G01S 19/47* (2013.01); *G02B 27/0172* (2013.01); *G06T 13/40* (2013.01); *G02B 2027/0141* (2013.01)

(58) Field of Classification Search
CPC ....... G06T 19/006; G06T 13/40; G01S 19/47; G01S 17/06; G02B 2027/0141
USPC ........................................................ 345/633
See application file for complete search history.

(56) References Cited

U.S. PATENT DOCUMENTS

| | | | |
|---|---|---|---|
| 8,788,197 B2 | 7/2014 | Fink | |
| 8,818,423 B2 | 8/2014 | Fink | |
| 9,110,502 B2 | 8/2015 | Fink | |
| 9,443,355 B2 * | 9/2016 | Chan | ........................ G06F 3/048 |
| 9,696,552 B1 | 7/2017 | Goergen et al. | |
| 10,338,400 B2 * | 7/2019 | Connor | ............... G02B 27/0172 |
| 10,551,483 B2 * | 2/2020 | Wyatt | .................... G01S 13/885 |
| 11,209,655 B2 * | 12/2021 | Amati | ................. G02B 27/0189 |
| 11,228,738 B2 * | 1/2022 | Vettese | ................... H04N 23/54 |
| 2012/0120498 A1 * | 5/2012 | Harrison | ................. G06F 3/012 |
| | | | 359/630 |

(Continued)

*Primary Examiner* — Javid A Amini
(74) *Attorney, Agent, or Firm* — Volpe Koenig

(57) ABSTRACT

Described herein are embodiments of methods and apparatuses for a wearable augmented reality system for fitness. The embodiments may include producing an avatar in the field of vision of the wearer, wherein a perceived position of the avatar may be controlled to aid the wearer in fitness training by establishing a controllable pace for the wearer. The embodiments may further include an optical system that produces the avatar such that it may be perceived by the wearer of the wearable augmented reality apparatus as a virtual running partner.

16 Claims, 20 Drawing Sheets

(56) References Cited

U.S. PATENT DOCUMENTS

| | | |
|---|---|---|
| 2012/0154920 A1 | 6/2012 | Harrison et al. |
| 2016/0037146 A1* | 2/2016 | McGrew |
| 2016/0209648 A1* | 7/2016 | Haddick .............. G04G 21/025 |
| 2016/0223815 A1* | 8/2016 | Dobschal ................. G02B 3/08 |
| 2016/0282621 A1* | 9/2016 | Widulle ................... G02B 5/10 |
| 2016/0364911 A1* | 12/2016 | Jo ........................ G06F 3/04815 |
| 2017/0005574 A1 | 1/2017 | Wyland |
| 2017/0079770 A1 | 3/2017 | Li |
| 2017/0083115 A1 | 3/2017 | Speck |
| 2018/0115797 A1* | 4/2018 | Wexler ................... G06Q 50/01 |
| 2018/0313939 A1* | 11/2018 | Thomas ................ G02B 27/142 |
| 2018/0348529 A1 | 12/2018 | Blum et al. |
| 2019/0004325 A1 | 1/2019 | Connor |
| 2019/0311539 A1 | 10/2019 | Hogue |
| 2020/0004291 A1* | 1/2020 | Wexler .................... G10L 15/10 |
| 2020/0089004 A1* | 3/2020 | Connor ............. G02B 27/0176 |
| 2020/0366872 A1* | 11/2020 | Vettese .................. A42B 3/042 |
| 2020/0400944 A1* | 12/2020 | Burnsed ................ H04N 23/45 |

\* cited by examiner

AUGMENTED REALITY SYSTEM FOR FITNESS

CROSS REFERENCE TO RELATED APPLICATION(S)

This application is a continuation of U.S. patent application Ser. No. 16/533,061, filed Aug. 6, 2019, which is a continuation of U.S. patent application Ser. No. 16/247,131, filed Jan. 14, 2019, which issued on Aug. 6, 2019 as U.S. Pat. No. 10,373,391, which claims the benefit of U.S. Provisional Application No. 62/661,328 filed Apr. 23, 2018, which is incorporated by reference as if fully set forth.

BACKGROUND

Augmented reality systems superimpose computer-generated images on a user's view of reality, thus providing a mixed or augmented reality. Wearable augmented reality apparatuses use multiple sensors in order to create a superimposed image that looks three dimensional to the user. Wearable augmented reality headsets use partially transparent reflectors to display images to the user, while not completely blocking out their vision of the real world. The position and orientation of these objects as perceived by the user are determined by the user's position in the real world, the sensors, and data that is typically uploaded to the wearable augmented reality apparatus from a smart device.

SUMMARY

Disclosed herein are embodiments of apparatuses and methods of a wearable augmented reality apparatus. Some embodiments may include a processor operationally coupled to an inertial measurement unit (IMU) and a global positioning system (GPS). Some embodiments may further include an optical engine operationally coupled to the processor. Some embodiments may further include an optical system including at least one Fresnel reflector. The optical system may be operationally coupled to the optical engine, and the optical system may be configured to produce an avatar superimposed on a field of vision of a wearer the wearable augmented reality apparatus using the Fresnel reflector. In some embodiments, the processor may be configured to control the optical engine to adjust a perceived position of the avatar based at least in part on data received from the IMU and the GPS unit.

In some embodiments, the Fresnel reflector may be partially transparent.

In some embodiments, the optical system may further include a light source configured to form an image, a collimator configured to collimate light from the image, a reflector configured to reflect the collimated light to create a plurality of light point sources. The Fresnel reflector may be configured to receive light based on the plurality of light point sources and produce a virtual image at a distance in front of the wearer's eye to create the avatar at the perceived position.

In some embodiments, the optical system may further include a microdisplay, wherein the microdisplay and the light source may be configured to form the image.

In some embodiments, the optical system may further include a beam expander. The beam expander may be configured to receive the image from the microdisplay and to output, to the collimator, an expanded version of the image.

In some embodiments, the optical system may further include a waveguide that may be configured to guide the collimated light from the collimator to the reflector through internal reflection. In some embodiments, the reflector may be a segmented reflector that may include a plurality of curved segments. In other embodiments, the reflector may be a diffuse reflector.

In some embodiments, the wearable augmented reality apparatus may include a sensor configured to measure a heart rate of the wearer.

In some embodiments, the wearable augmented reality apparatus may include at least one speaker configured to output sound based on at least a portion of the data received from the IMU and the GPS unit.

BRIEF DESCRIPTION OF THE DRAWINGS

A more detailed understanding can be had from the following description, given by way of example in conjunction with the accompanying drawings wherein.

DETAILED DESCRIPTION

Among the largest problems runners face when training individually is the difficulty of keeping a consistent pace, improving over time, and having a structured regimen. By generating what a user would interpret as a three dimensional (3D) avatar, a runner can compete against this avatar in order to gauge his/her own pace during the run and attempt to improve over time as the perceived pace of the avatar gets faster over a series of workouts. Additionally or alternatively, any other motion of the avatar may be modified. For example, the distance of a run may be changed, a path of a run may be changed, or a perceived speed of the avatar may be changed during any portion of a run. In addition, an audio component can be introduced into workouts, either by simulating the sounds of an actual race, signaling the simulated approach of the avatar, or simply by playing music for the user.

Disclosed herein are embodiments of an augmented reality system wherein a wearable augmented reality apparatus may receive input data that may determine the path and instantaneous speed of a holographic avatar at any point along the path.

In operation, data from a sensor system that may be included in the wearable augmented reality apparatus or may be coupled to the wearable augmented reality apparatus may send data to a processor that may be included in the wearable augmented reality apparatus, which may be used to modify outputs of the apparatus.

In some embodiments, one or more optical systems may be included in the wearable augmented reality apparatus and may process and/or may guide light to form a specific optical output that may be received by one or more eyes such that a user may view one or more images. In some embodiments, the formation of a virtual image may be accomplished with a Fresnel reflector that may be included in the one or more optical systems.

During or after operation, data about the user's movements, etc. may be uploaded to a smart device once the smart device is paired with the wearable augmented reality apparatus.

As used herein, the term Fresnel reflector may include a reflector whose surface is comprised of reflective segments that can all be translated along parallel axes to form a single, continuous reflector with a different surface shape than the original reflector.

Figure 1A:
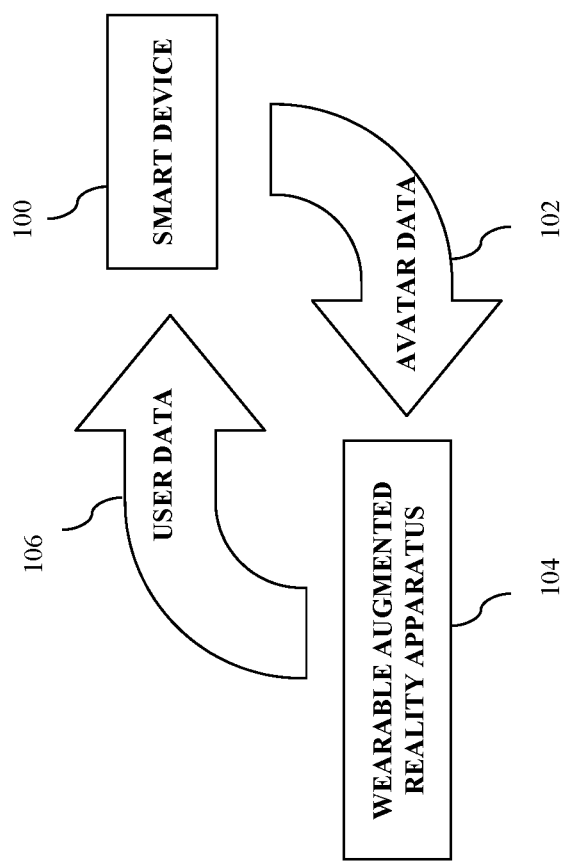
FIG. 1A is a block diagram of an example system data exchange between a smart device and a wearable augmented reality apparatus in accordance with some embodiments.

FIG. 1A is a block diagram of an example augmented reality system depicting data transfers between a smart device 100 and a wearable augmented reality apparatus 104 in accordance with some embodiments. Wearable augmented reality apparatus 104 may receive avatar data 102 from smart device 100. In accordance with some embodiments, avatar data 102 may comprise a list of global positioning system (GPS) points with associated altitudes and times for each point, such that, in operation, the full absolute path and speed for an avatar relative to the wearer of the wearable augmented reality apparatus may be extrapolated from this data.

As shown in FIG. 1A, wearable augmented reality apparatus 104 may send user data 106 to smart device 100. In accordance with some embodiments, user data 106 may comprise data regarding user movement during one or more workouts. In accordance with some embodiments, user data 106 may also comprise data regarding a user's heart rate during one or more workouts.

Figure 1B:
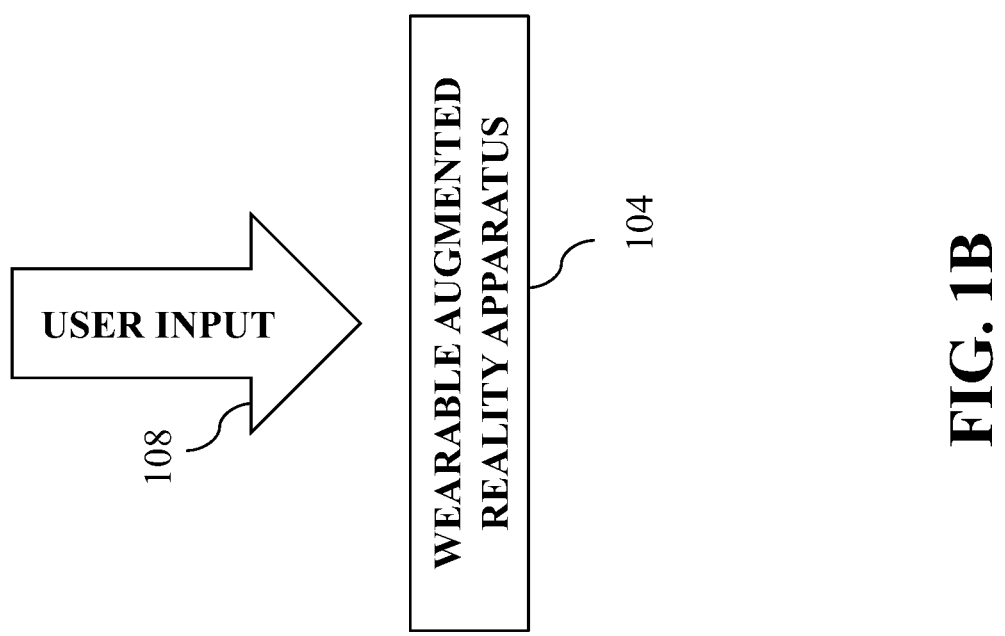
FIG. 1B is a block diagram of another example system of the wearable augmented reality apparatus in accordance with some embodiments.

As shown in FIG. 1B, in accordance with some other embodiments, user input 108 may be entered directly into wearable augmented reality apparatus 104, without the aid of a separate smart device. In accordance with other embodiments, a combination of FIG. 1A and FIG. 1B may be implemented, wherein some avatar data 102 may be transmitted to the wearable augmented reality apparatus 104 from a smart device 100 and some user data 106 may be sent by the wearable augmented reality apparatus 104 to the smart device 100, while the wearable augmented reality apparatus 104 also receives some user input 108. The wearable augmented reality apparatus 104 may also process and generate some avatar data in addition to that received from smart device 100 and may also store and/or process some user data 106 without sending this user data 106 to a separate smart device 100.

Figure 2:
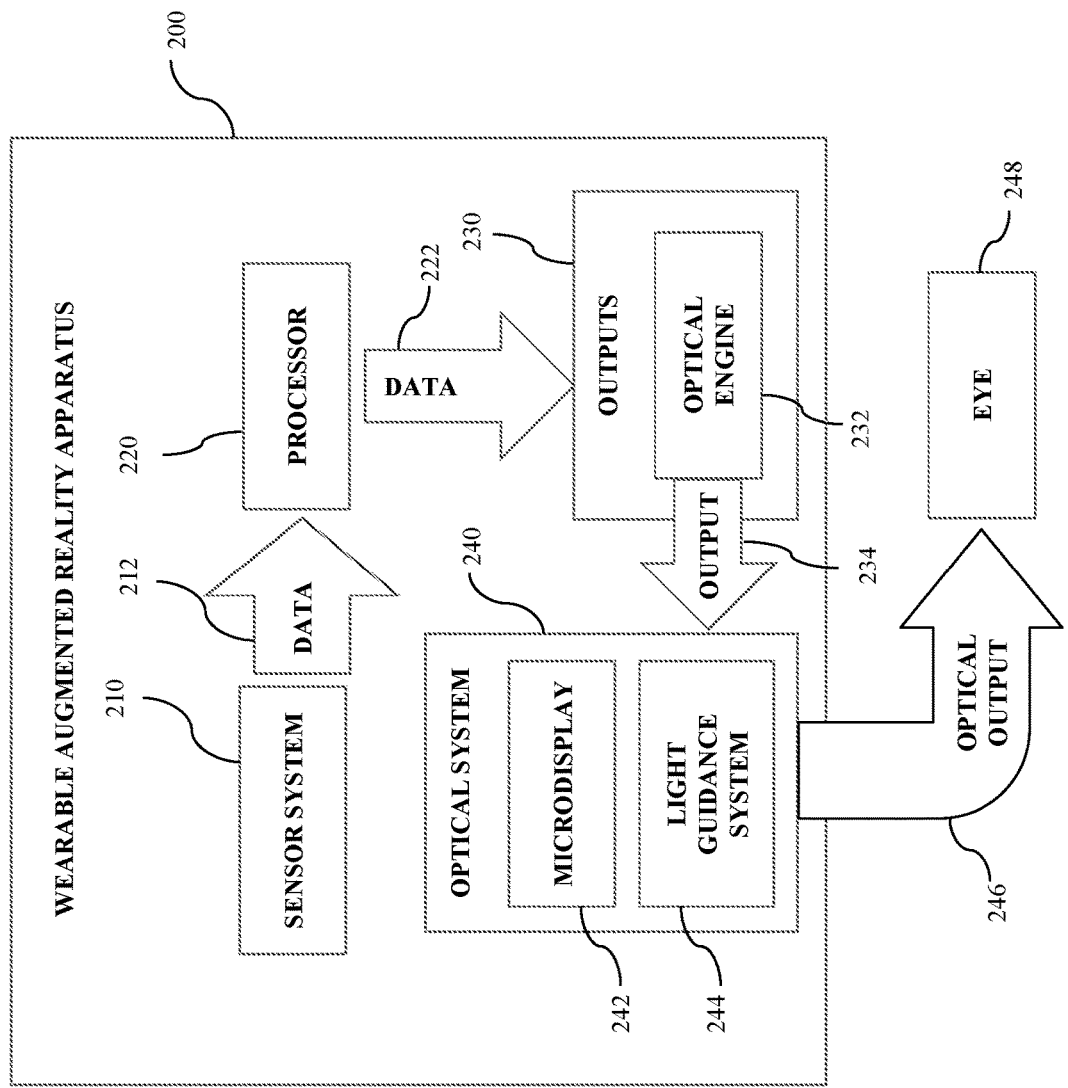
FIG. 2 is a block diagram of an example system depicting a monocular wearable augmented reality apparatus in accordance with some embodiments.

FIG. 2 is a block diagram of an example wearable augmented reality apparatus 200. Wearable augmented reality apparatus may be monocular and may be an example of wearable augmented reality apparatus 104 in FIGS. 1A and 1B. The wearable augmented reality apparatus 200 may include sensor system 210. Sensor system 210 may send data 212 to processor 220, which may contain one or more processors. In some embodiments, data 212 may provide at least a part of user data 106 as shown in FIG. 1A.

Processor 220 may process data 212 and send data 222 to output system 230. In accordance with some embodiments, processor 220 may include memory and/or storage and may be capable of storing data. Alternatively, processor 220 may be operatively coupled to memory and/or storage. Output system 230 may include at least one optical engine 232. In some embodiments, data 222 may alter the output 234 of optical engine 232. In accordance with some embodiments, output 234 from optical engine 232 may be coupled to optical system 240 and may alter the image displayed on microdisplay 242 in optical system 240, which might alter the optical output 246 of optical system 240. As shown in FIG. 2, system 240 may contain microdisplay 242 and light guidance system 244. In accordance with some embodiments of optical system 240, light guidance system 244 may include at least one Fresnel reflector. In some embodiments, optical system 240 may contain a Fresnel reflector coupled to or included in light guidance system 244.

In accordance with some embodiments, the optical output 246 of optical system 240 may be seen by an eye 248 of the user of the wearable augmented reality system 200.

Figure 3:
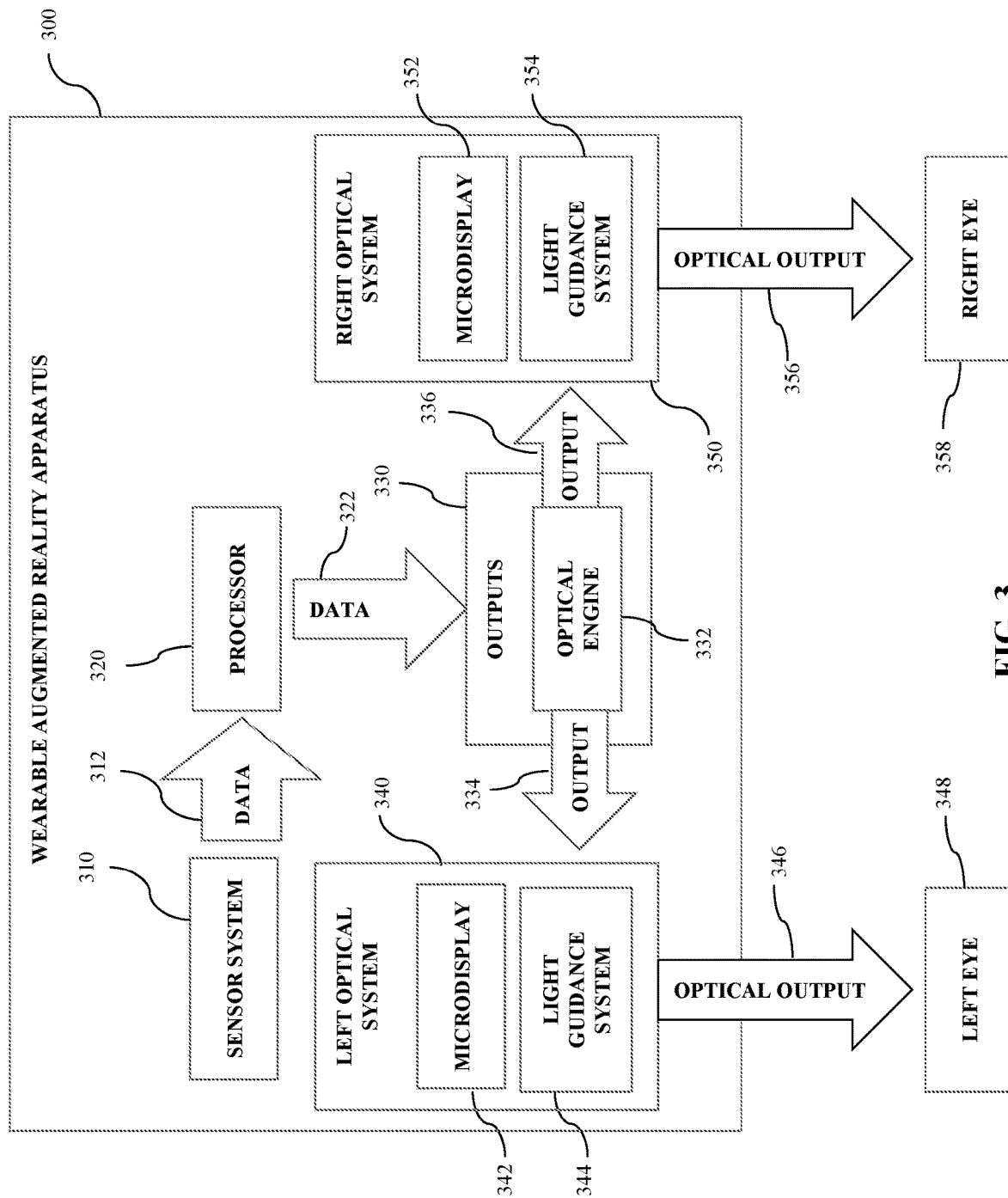
FIG. 3 is a block diagram of an example system depicting a binocular wearable augmented reality apparatus in accordance with some embodiments.

FIG. 3 is a block diagram depicting an example wearable augmented reality apparatus 300. Wearable augmented reality apparatus 300 may be binocular and may be an example of wearable augmented reality apparatus 104 depicted in FIGS. 1A and 1B. In accordance with some embodiments, wearable augmented reality apparatus 300 may comprise sensor system 310, which may send data 312 to processor 320, which may contain one or more processors. In accordance with some embodiments, processor 320 may be capable of storing data. Sensor system 310 may be one sensor system or may be a plurality of sensor systems that may include duplicates of sensors for use with left optical system 340 and right optical system 350. In accordance with some embodiments, data 312 may comprise similar information to data 212 as depicted in FIG. 2. As shown in FIG. 3, processor 320 may process data 312 and send data 322 to output system 330. Output system 330 may include at least optical engine 332. In some embodiments, optical engine 332 may be one or more optical engines. In accordance with some embodiments, optical engine 332 may contain one or more optical drivers. In some embodiments, data 322 may alter outputs 334 and 336 from optical engine 332. In accordance with some embodiments, outputs 334 and 336 may change the image on microdisplays 342 and 352 and may change the perceived position of the avatar as perceived by the user.

In accordance with some embodiments, an output from optical engine 332 may affect left optical system 340 and/or right optical system 350. In accordance with some embodiments, both left optical system 340 and right optical system 350 may contain microdisplays 342 and 352, respectively. In accordance with some embodiments, both left optical system 340 and right optical system 350 may also contain light guidance systems 344 and 354, respectively. In accordance with some embodiments, light guidance system 344 and/or light guidance system 354 may include at least one Fresnel reflector. In some embodiments, left optical system 340 and/or right optical system 350 may contain a Fresnel reflector coupled to or included in the associated light guidance system 344/354.

In accordance with some embodiments, the optical output 346 of left optical system 340 may be seen by the left eye 348 of the user of wearable augmented reality system 300. In accordance with some embodiments, the optical output 356 of right optical system 350 may be seen by the right eye 358 of the user of wearable augmented reality system 300. In accordance with some embodiments, left optical system 340 and right optical system 350 may be constructed such that optical output 346 and optical output 356 may be slightly different such that the outputs create a parallax effect when viewed by the user, giving the impression that the avatar is a certain distance away from the user and is 3D.

Figure 4A:
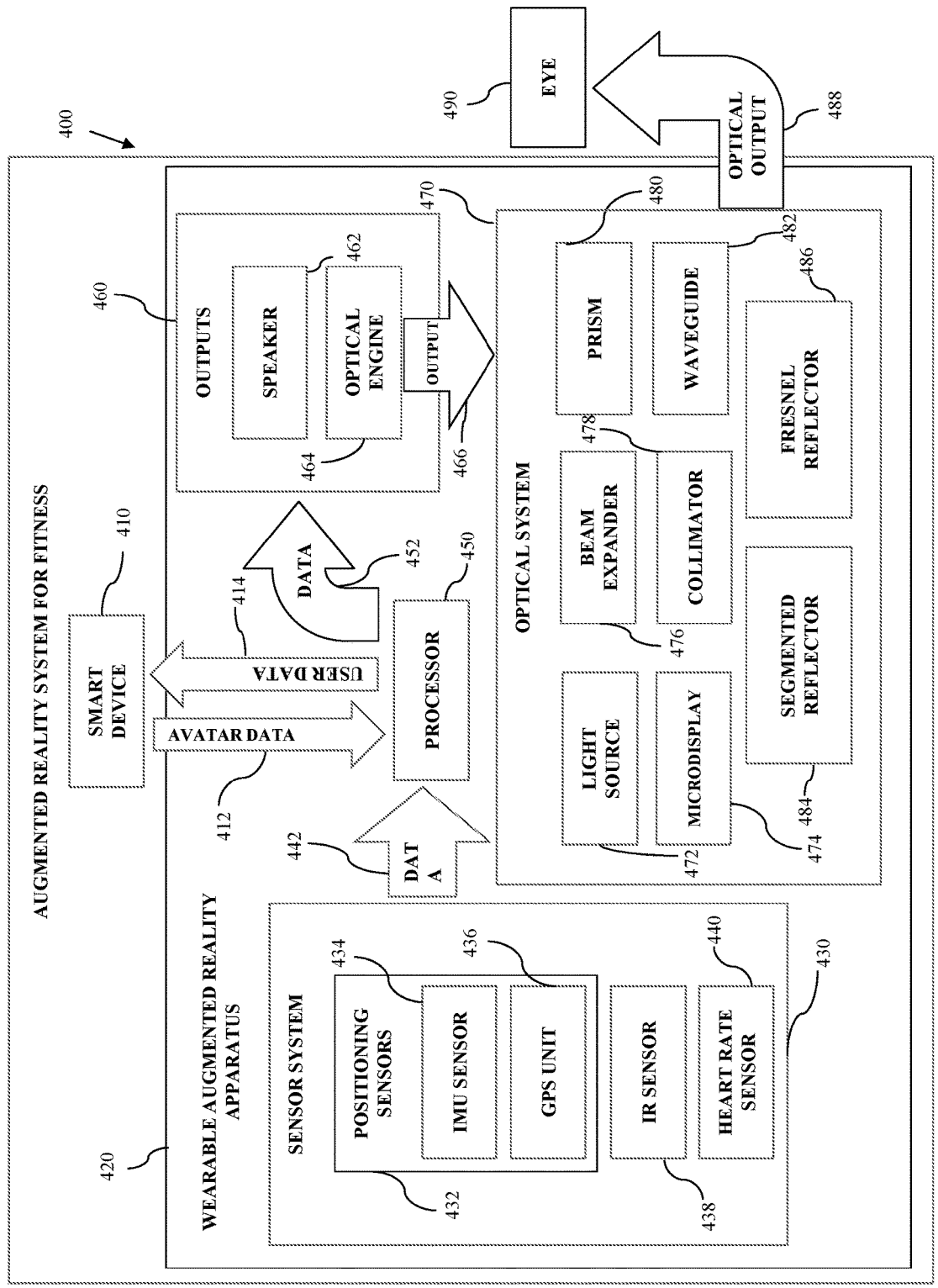
FIG. 4A is a block diagram of an example system depicting an augmented reality system for fitness in accordance with some embodiments.
Figure 4B:
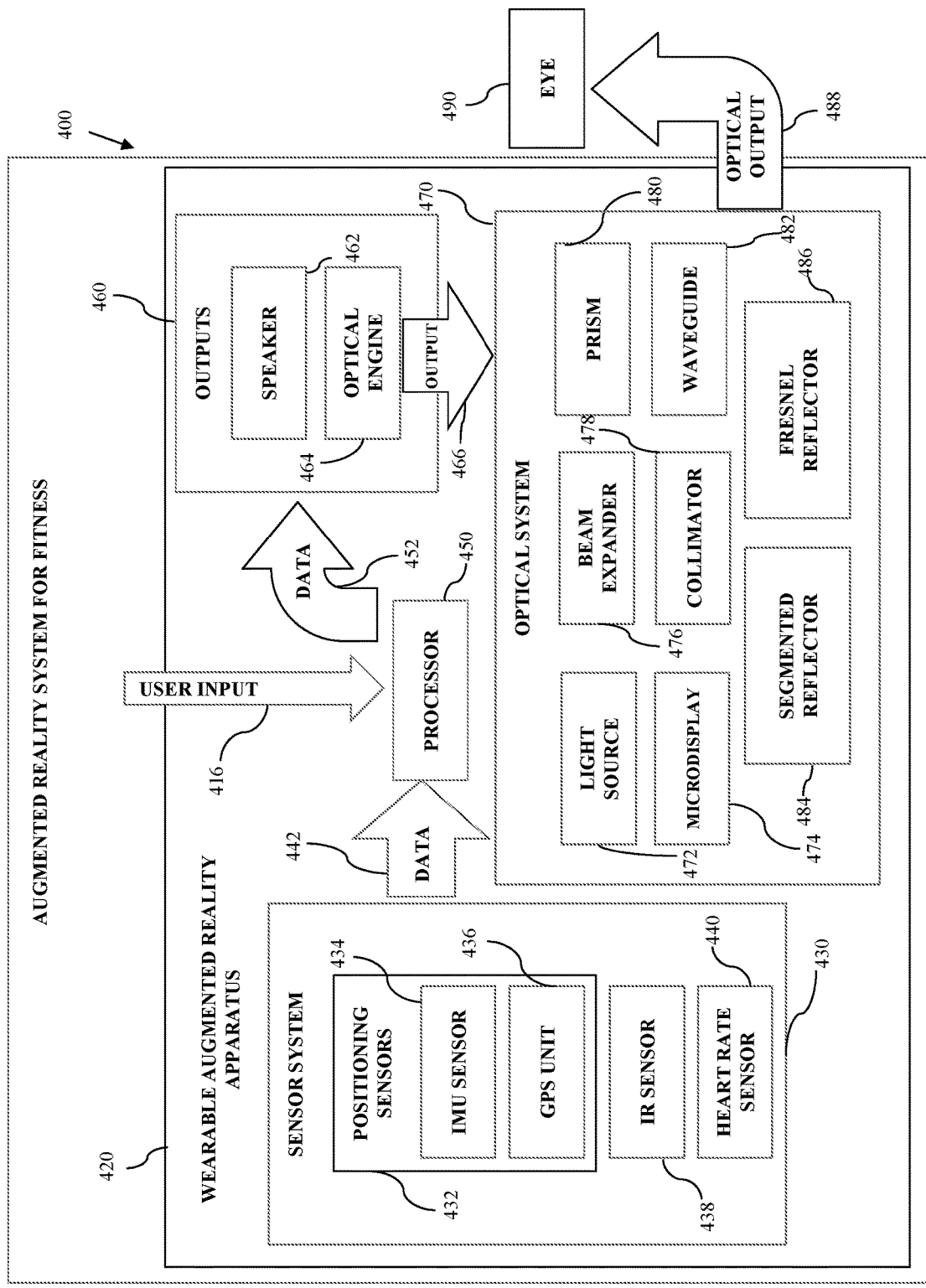
FIG. 4B is a block diagram of another example system depicting the augmented reality system for fitness in accordance with some embodiments.

FIG. 4A shows a block diagram of an example system for the augmented reality system 400. As shown in FIG. 4A, smart device 410 may send avatar data 412 to processor 450 in wearable augmented reality apparatus 420. As shown in FIG. 4B, in accordance with some other embodiments, processor 450 in wearable augmented reality apparatus 420 may directly receive user input 416 without the use of a separate smart device.

Wearable augmented reality apparatus 420 as shown in FIGS. 4A and 4B may be examples of wearable augmented reality apparatus 200 as shown in FIG. 2. As shown in FIGS. 4A and 4B, wearable augmented reality system 420 may comprise sensor system 430. In some embodiments, sensor system 430 may comprise a positioning sensors 432, which may sense user position and orientation. Position sensor 432 may comprise at least one inertial measurement unit (IMU) sensor 434 and at least one GPS unit 436. In some embodiments, IMU sensor 434 includes a gyroscope, a magnetometer and/or an accelerometer. In accordance with some embodiments, GPS unit 436 may contain or may be coupled to at least one antenna.

In accordance with some embodiments, sensor system 430 may also contain at least one infrared (IR) sensor 438.

In some embodiments, IR sensor 438 may be used as a proximity sensor to determine the distance between wearable augmented reality apparatus 420 and the ground, which may indicate the height of a user of wearable augmented reality apparatus 420. In some embodiments, IR sensor 438 may be used to determine the distance between the wearable augmented reality apparatus 420 and any objects and/or obstacles in its immediate vicinity. In accordance with some embodiments, sensor system 430 may also contain heart rate sensor 440, which may record the heart rate of the user of wearable augmented reality apparatus 420. In accordance with some embodiments, heart rate sensor 440 may be an IR sensor.

In accordance with some embodiments, sensor system 430 may send data 442, which may contain readings taken from sensors in system 430, to processor 450. In accordance with some embodiments, processor 450 may be capable of storing data. In accordance with some embodiments, during operation of wearable augmented reality apparatus 420, processor 450 may combine avatar data 412 with data 442 and may output data 452 to output system 460. In some embodiments, processor 450 only takes in data 442.

In accordance with some embodiments, output system 460 may comprise at least one speaker 462. In accordance with some embodiments, data 452 may change the auditory output of at least one speaker 462. In accordance with some embodiments, data 452 may cause speaker 462 to play stored audio clips at various speeds depending on the user's performance during a workout. In some embodiments, speaker 462 may be a bone conduction speaker, so as not to obstruct a user's hearing, and in other embodiments, speaker 462 may not be a bone conduction speaker.

In accordance with some embodiments, output system 460 may contain optical engine 464. In some embodiments, output 466 from optical engine 464 may change the image displayed on microdisplay 474 which may alter optical output 488 of optical system 470 and change the avatar position and orientation as perceived by the user. In accordance with some embodiments, optical system 470 may comprise at least one light source 472 and at least one microdisplay 474. In accordance with some embodiments, output 466 may change the brightness of at least one of light source 472.

In accordance with some embodiments, light emitted from microdisplay 474 may pass through beam expander 476 and collimator 478, which may create a collimated and expanded beam. In some embodiments, beam expander 476 and collimator 478 may be incorporated into a single optical element. In other embodiments, beam expander 476 and collimator 478 may be separate and/or composed of one or more optical elements.

Figure 4C:
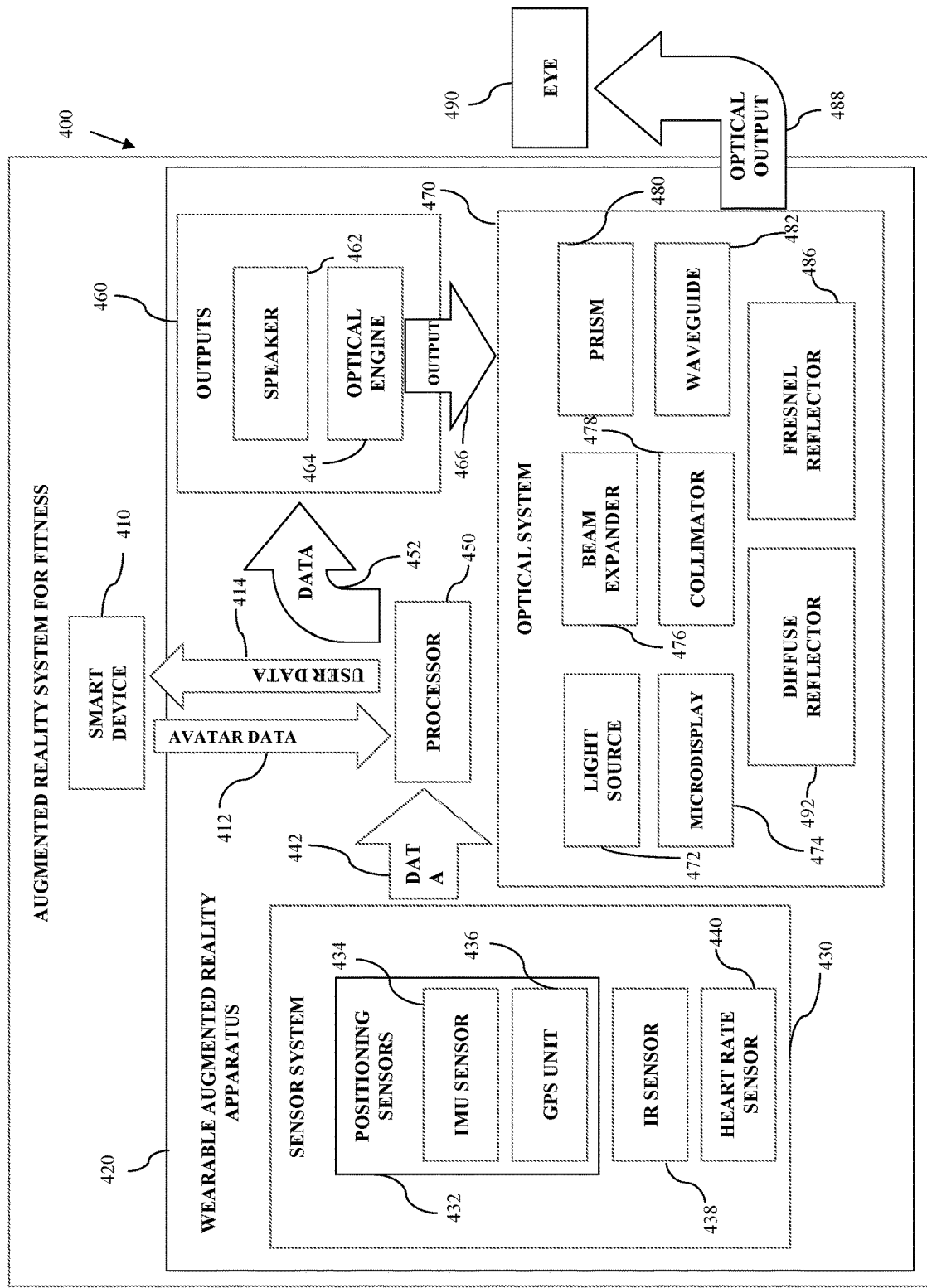
FIG. 4C is a block diagram of another example system depicting the augmented reality system for fitness in accordance with some embodiments.

In accordance with some embodiments, a collimated beam that may be emitted from collimator 478 may pass through prism 480 and may enter and propagate through waveguide 482. In some embodiments, light may not enter prism 480 and instead may directly enter waveguide 482. As shown in FIGS. 4A and 4B, in accordance with some embodiments, after propagating through waveguide 482, light may be reflected off of segmented reflector 484. In some embodiments, segments in segmented reflector 484 may be curves. In some embodiments, the individual segments may be parabolic and in some other embodiments, the segments may be spherical. As shown in FIG. 4C, in accordance with some embodiments, after propagating through waveguide 482, light may be reflected off of a diffuse reflector 492.

In accordance with some embodiments, the light reflected off segmented reflector 484 or diffuse reflector 492 may be subsequently reflected off of Fresnel reflector 486. In accordance with some embodiments, light reflected off of 486 Fresnel reflector 486 may comprise the optical output 488, and may be viewed by a user's eye 490.

As shown in FIG. 4A, after or during the operation of wearable augmented reality apparatus 420, user data 414, which may comprise information from data 442 stored in processor, may be sent to smart device 410 from processor 450. In accordance with other embodiments, a combination of FIG. 4A and FIG. 4B may be implemented, wherein some avatar data 412 may be transmitted to the wearable augmented reality apparatus 420 from a smart device 410 and some user data 414 may be sent by the wearable augmented reality apparatus 420 to the smart device 410, while the wearable augmented reality apparatus 420 also receives some user input 416. The wearable augmented reality apparatus 420 may also process and generate some avatar data in addition to that received from smart device 410 and may also store and/or process some user data 414 without sending this user data 414 to a separate smart device 410.

Figure 5:
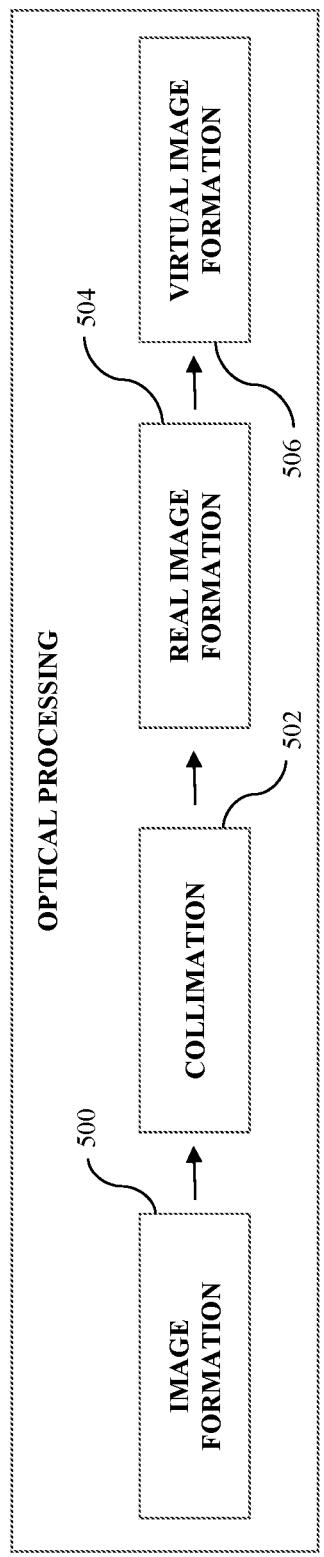
FIG. 5 is a block diagram of an example optical processing system in accordance with some embodiments.

FIG. 5 shows a block diagram depicting an example of optical processing of light, such as that performed by the optical system 240 shown in FIG. 2. In accordance with some embodiments, image formation 500 may be implemented by a microdisplay, such as microdisplay 242 shown in FIG. 2. In accordance with some embodiments, collimation 502, real image formation 504, and virtual image formation 506 as shown in FIG. 5 may be performed by, for example, light guidance system 244 shown in FIG. 2. After image formation 500, light may undergo the process of collimation 502, which may convert the image into parallel rays of collimated light. Subsequently, the collimated light may undergo the process of real image formation 504, wherein the parallel rays of collimated light may change direction such that the light behaves as if it had originated from a plurality of light point sources, which may effectively act as a real image. Subsequently, the light from the real image may be reflected such that a virtual image may be formed at a different location than the real image via the process of virtual image formation 506. In accordance with some embodiments, virtual image formation 506 may form a virtual image that may be located more than approximately seven centimeters in front of a user's eye. In accordance with some embodiments, virtual image formation 506 may form a virtual image located approximately 67 centimeters in front of a user's eye.

Figure 6:
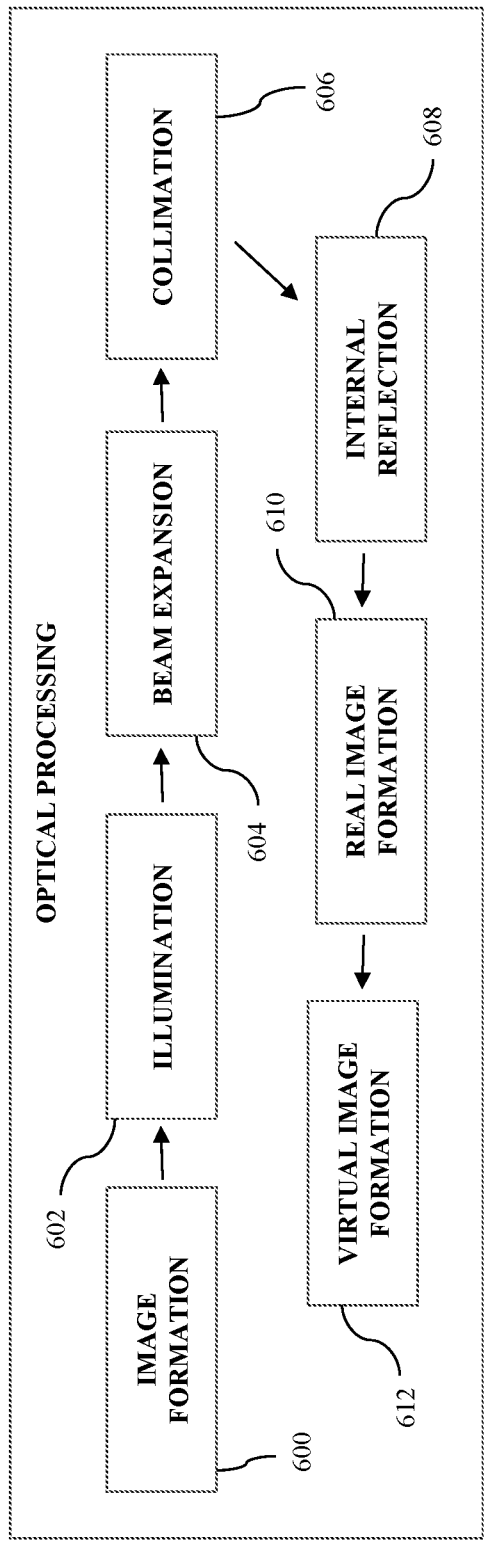
FIG. 6 is a block diagram of another example of an optical processing system in accordance with some embodiments.

FIG. 6 shows a block diagram that depicts another example of optical processing. The optical processing shown in FIG. 6 may be an example of the optical processing shown in FIG. 5. In accordance with some embodiments, image formation 600 may be performed similarly as image formation process 500 shown in FIG. 5. After an image is formed, it may undergo a process of illumination 602, wherein an overall brightness of the image is increased.

A beam of light output from illumination 602 may undergo the process of beam expansion 604, wherein the average diameter of the beam of light may be increased. The beam of light may also undergo the process of collimation 606. In some embodiments, processes 604 and 606 may be accomplished within a single optical element. In some other embodiments, the beam may not undergo process 604.

After the beam of light is collimated by process 606, in accordance with some embodiments, collimated light may undergo the process of one or more internal reflections 608 within one or more pieces of material. Subsequently, collimated light may undergo the process of real image formation 610, which may be accomplished similarly as by real image formation 504 shown in FIG. 5 to form a real image, wherein the collimated light may change direction such that the light behaves as if it had originated from a plurality of light point sources, which may effectively act as a real image. Subsequently, the light from the real image may be reflected such that a virtual image may be formed at a different location than that of the real image via the process of virtual image formation 620, which may be accomplished similarly as by real image formation 506 shown in FIG. 5.

Figure 7:
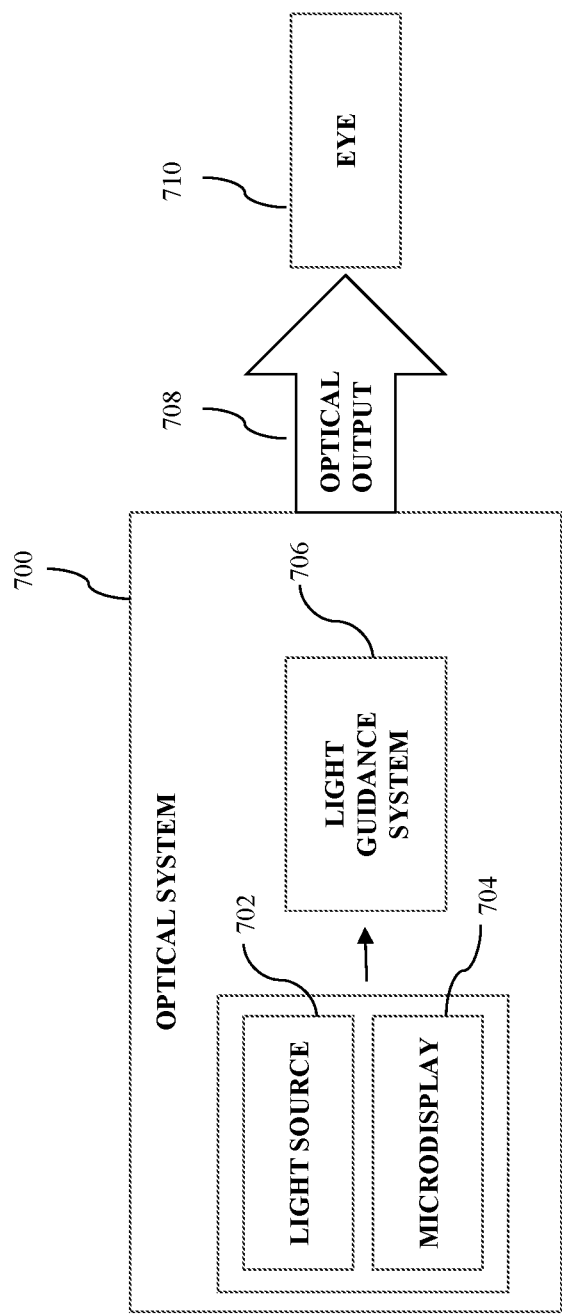
FIG. 7 is a block diagram of an example optical system included in the wearable augmented reality apparatus in accordance with some embodiments.

FIG. 7 shows a block diagram of an example optical system 700. Optical system 700 may be an example of optical system 240 as shown in FIG. 2 and may peform the optical processing as shown in FIG. 5 and/or FIG. 6. In accordance with some embodiments, optical system 700 may comprise light source 702 and microdisplay 704. In some embodiments, light source 702 and microdisplay 704 may be configured such that microdisplay 704 is back-lit. In some other embodiments, light source 702 and microdisplay 704 may be configured such that microdisplay 704 is front-lit.

In accordance with some embodiments, light source 702 and microdisplay 704 may perform image formation 500 as shown in FIG. 5. In accordance with some embodiments, light guidance system 706 may perform processes 502, 504 and 506 as shown in FIG. 5, in order to form an optical output 708 that eye 710 may interpret as a clear, discernible image.

Figure 8A:
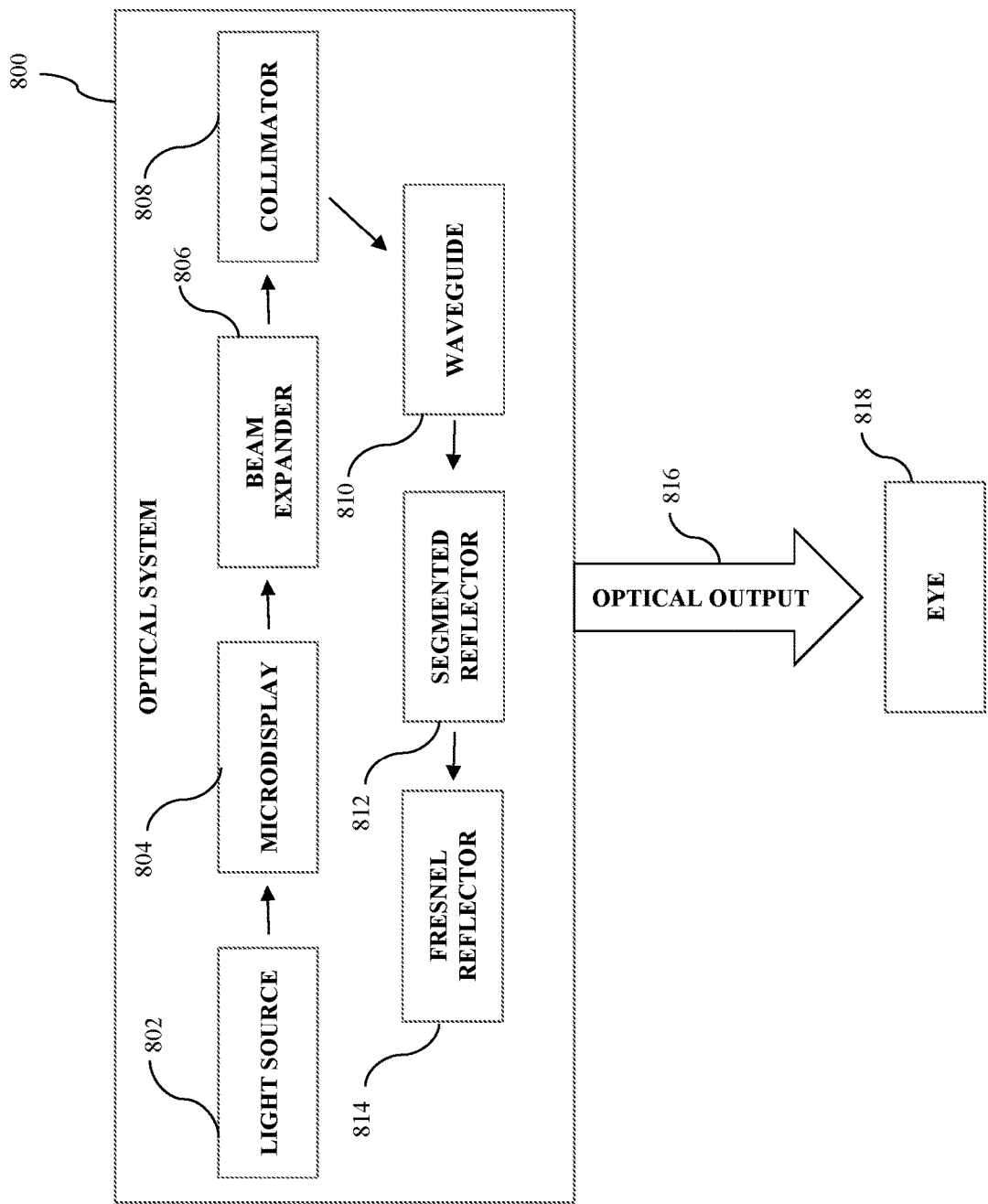
FIG. 8A is a block diagram of another example optical system included in the wearable augmented reality apparatus in accordance with some embodiments.
Figure 8B:
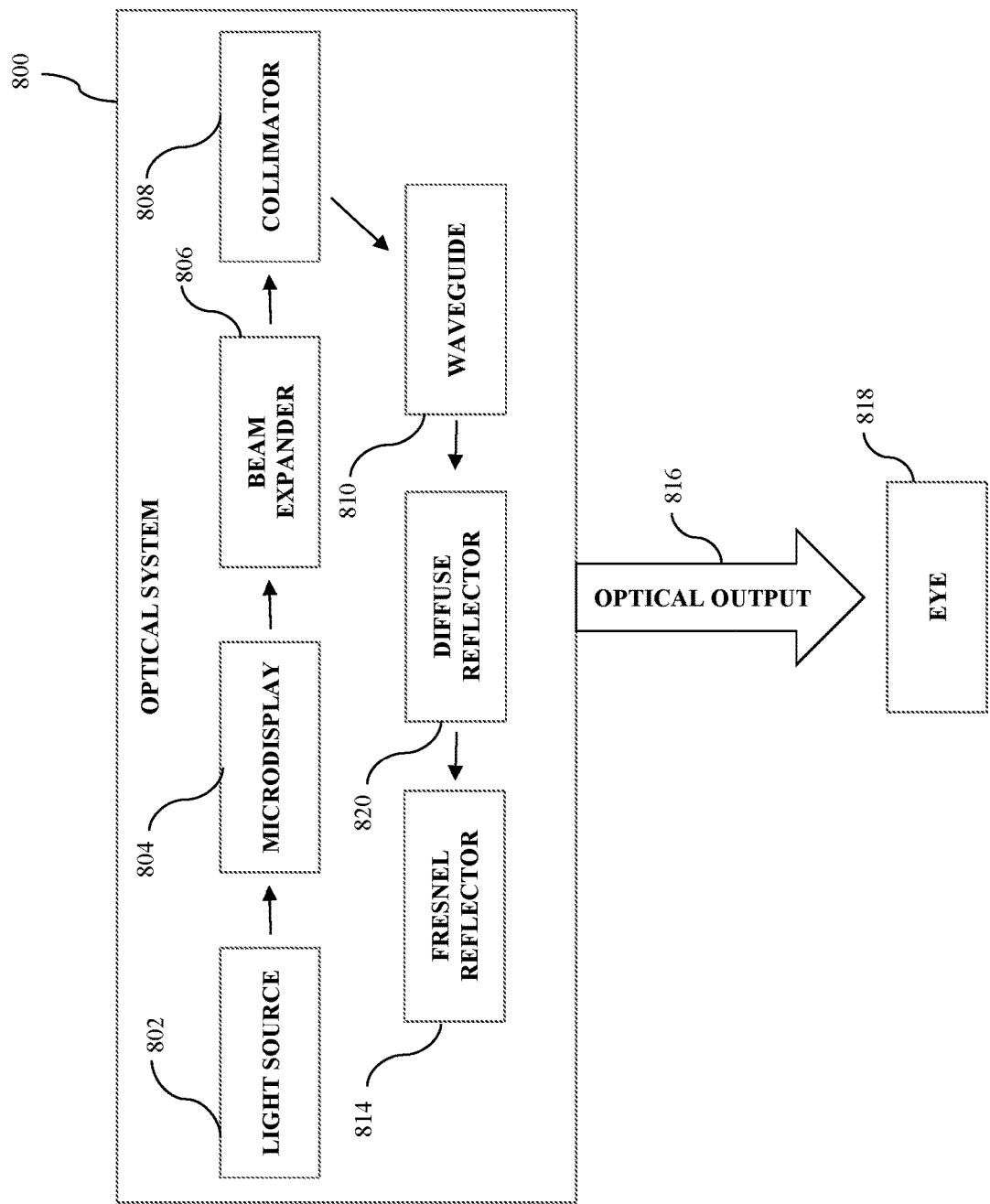
FIG. 8B is a block diagram of another example optical system included in the wearable augmented reality apparatus in accordance with some embodiments.

FIGS. 8A and 8B depict examples of optical system 800. Optical system 800 may be an example of optical system 240 as shown in FIG. 2 and/or optical system 470 as shown in FIGS. 4A and 4B. In some embodiments, optical system 800 may perform the optical processing shown in FIG. 6. In accordance with some embodiments, optical system 800 may comprise microdisplay 804 which may perform image formation 600 as shown in FIG. 6. In accordance with some embodiments, light source 802 may perform illumination 602 as shown in FIG. 6. In some embodiments, light source 802 and microdisplay 804 may be configured such that microdisplay 804 is back-lit. In some other embodiments, light source 802 and microdisplay 804 may be configured such that microdisplay 804 is front-lit.

In accordance with some embodiments, beam expander 806 may perform beam expansion 604 as shown in FIG. 6. In some embodiments, beam expander 806 may comprise one or more optical elements, such as one or more lenses. In some embodiments, beam expander 806 may contain one or more reflectors. In accordance with some embodiments, collimator 808 may perform collimation 606 as shown in FIG. 6. In some embodiments, collimator 808 may comprise one or more optical elements, such as one or more lenses. In some embodiments, collimator 808 may contain one or more reflectors. In some embodiments, a single optical element, or a series of optical elements may function as both beam expander 806 and collimator 808.

In accordance with some embodiments, collimated light emitted from collimator 808 may be redirected to a new location via propagation in waveguide 810, which may translate the beam through internal reflection 608 as shown in FIG. 6 one or more times within waveguide 810. As shown in FIG. 8A, in accordance with some embodiments, the beam output from waveguide 810 may reflect off of segmented reflector 812, which may perform real image formation 610 as shown in FIG. 6. As shown in FIG. 8B, in accordance with some other embodiments, the beam output from waveguide 810 may reflect off of diffuse reflector 820, which may also perform real image formation 610 as shown in FIG. 6.

In some embodiments, the image formed by segmented reflector 812 or diffuse reflector 820 may reflect off of Fresnel reflector 814, which may perform virtual image formation 612, whereby a virtual image is formed that is a sufficiently large distance from eye 818 such that eye 818 may interpret optical output 816 of optical system 800 as a clear, discernible image. In accordance with some embodiments, virtual image formation 612 forms a virtual image that may be located more than approximately seven centimeters in front of eye 818. In accordance with some embodiments, virtual image formation 612 may form a virtual image located approximately 67 centimeters in front of eye 818.

Figure 9:
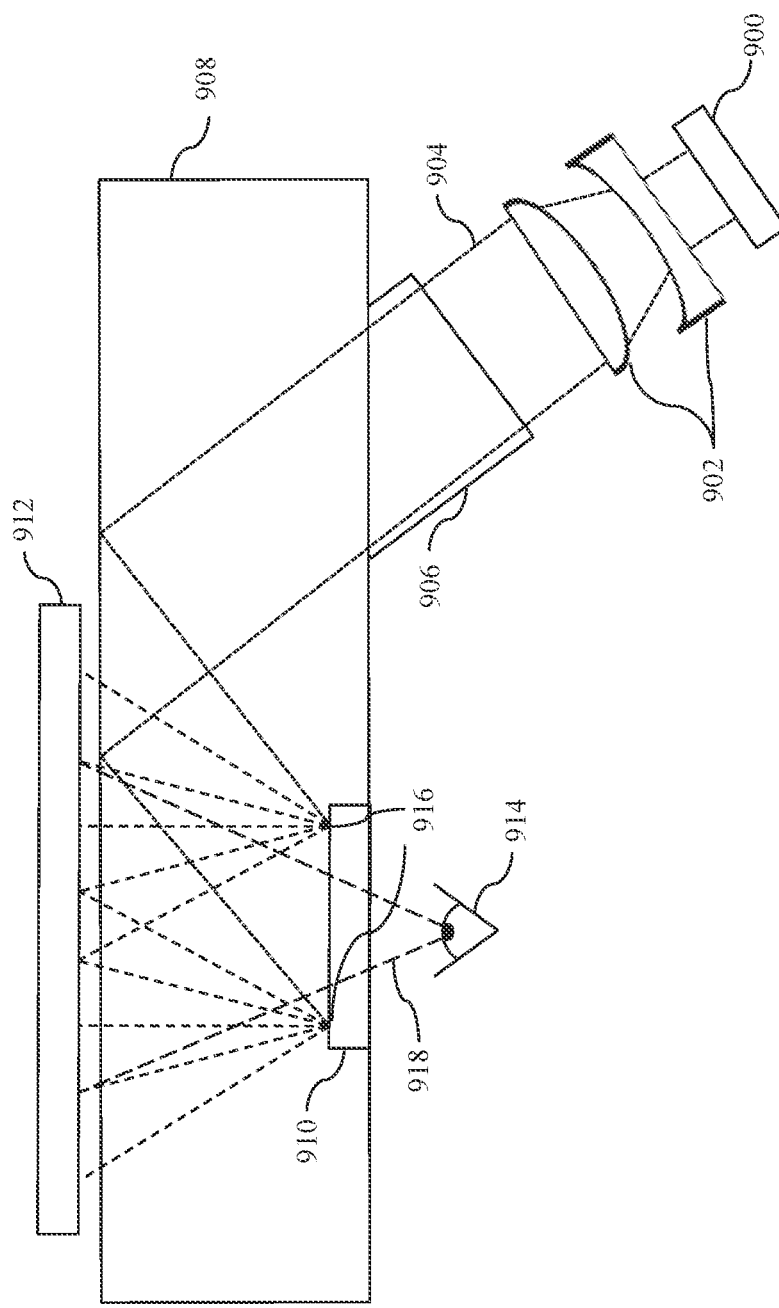
FIG. 9 is a diagram of an implementation of the optical system for use in the wearable augmented reality apparatus in accordance with some embodiments.

FIG. 9 shows a diagram of an example implementation of optical system 240 as shown in FIG. 2. In accordance with some embodiments, light from microdisplay 900 may pass through optical elements 902 which may output the expanded and collimated beam 904. In accordance with some embodiments, beam 904 may pass through prism 906. As depicted in FIG. 9, the face of prism 906 may be perpendicular to the incident beam 904, but in alternative embodiments, the face of prism 906 may not be perpendicular to the incident beam 904.

In accordance with some embodiments, after passing through prism 906, beam 904 may enter waveguide 908, wherein beam 904 may reflect of the walls of waveguide 908 through internal reflection. In some embodiments, prism 906 and waveguide 908 may be separate components and in other embodiments prism 906 and waveguide 908 may be a singular element. In yet other embodiments, one of either the prism 906 or waveguide 908 may be eliminated. Beam 904 may ultimately be reflected off of reflector 910, which may be a segmented reflector and/or a diffuse reflector, either of which may convert the beam into a real image. Light reflected off of reflector 910 may then be reflected off of Fresnel reflector 912 to form a virtual image that may be seen by eye 914. In accordance with some embodiments, waveguide 908 may be at least partially transparent. In accordance with some embodiments, reflector 910 and Fresnel reflector 912 may be partially transparent.

Figure 10:
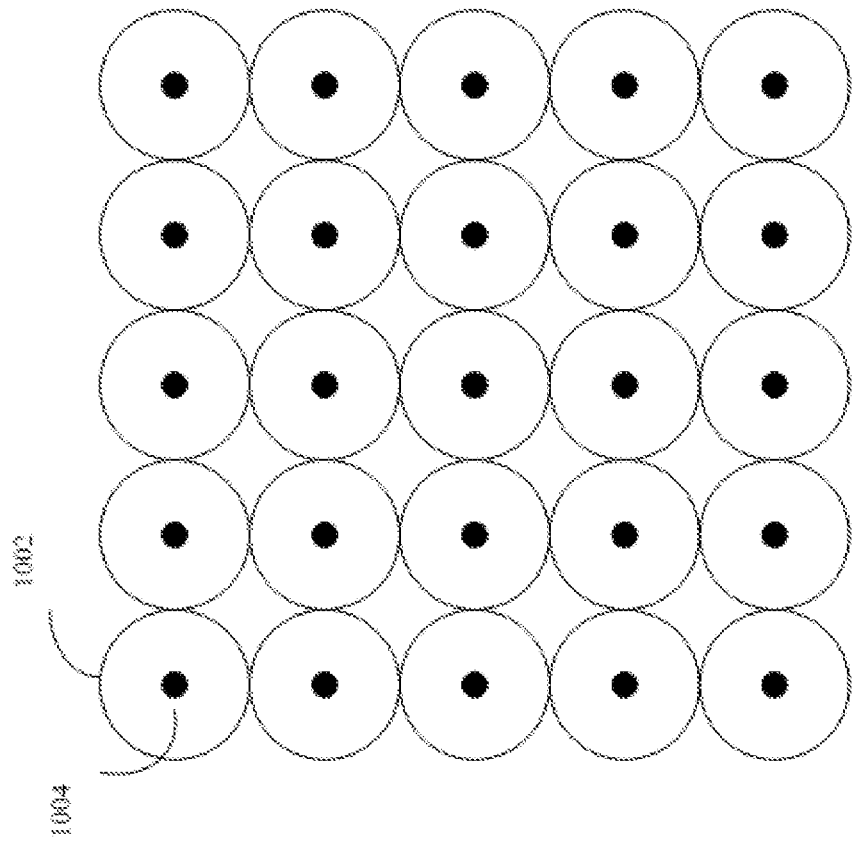
FIG. 10 is a diagram of a cross-section and a top-down view of an example segmented reflector with convex curved segments for use in the wearable augmented reality apparatus in accordance with some embodiments.
Figure 10:
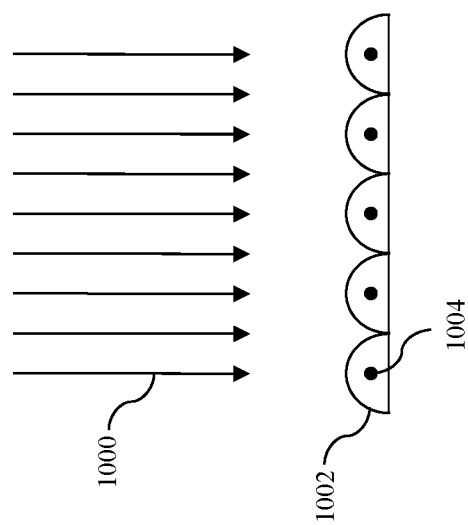

FIG. 10 depicts a cross-section and a top-down view of an example implementation of segmented reflector 910 as shown in FIG. 9 with convex, reflective spherical segments like segment 1002. In accordance with some embodiments, incident rays 1000 that strike segment 1002 may be reflected such that resultant rays may all be back-traced to a point at or near focus 1004. The segmented reflector depicted in FIG. 10 having a grid of many small, convex, spherical segments like segment 1002 may transform a beam of collimated incident light into an effective real image, since all light may propagate as if from a series of densely packed point sources. Although FIG. 10 depicts the segmented reflector as being perpendicular to incident light 1000, the segmented reflector need not be perpendicular to the incident light 1000. Furthermore, although FIG. 10 depicts the top-down view as having a rectangular base, the base need not be rectangular.

Figure 11:
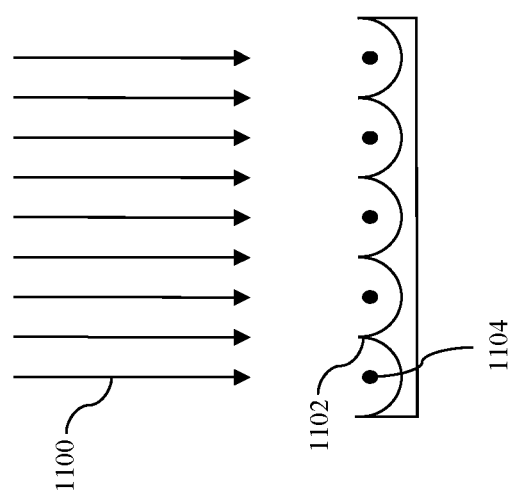
FIG. 11 is a diagram of a cross-section of an example segmented reflector with concave curved segments for use in the wearable augmented reality apparatus in accordance with some embodiments.

FIG. 11 depicts a cross-section of an example implementation of segmented reflector 910 as shown in FIG. 9 with concave, reflective spherical segments like segment 1102. Although FIG. 11 depicts concave, spherical segments, in other embodiments, concave, parabolic segments may be used. In accordance with some embodiments, incident rays 1100 that strike segment 1102 may be reflected such that resultant rays may all be back-traced to a point at or near focus 1104. Similar to the reflector shown in FIG. 10, the segmented reflector depicted in FIG. 11 having a grid of many small, concave, spherical segments like segment 1102 may transform a beam of collimated incident light into an effective real image. A top-down view of the segmented reflector depicted in FIG. 11 may appear similar as the top-down view depicted in FIG. 10. Although FIG. 11 depicts the segmented reflector as being perpendicular to incident light 1100, the segmented reflector need not be perpendicular to the incident light 1100.

Figure 12:
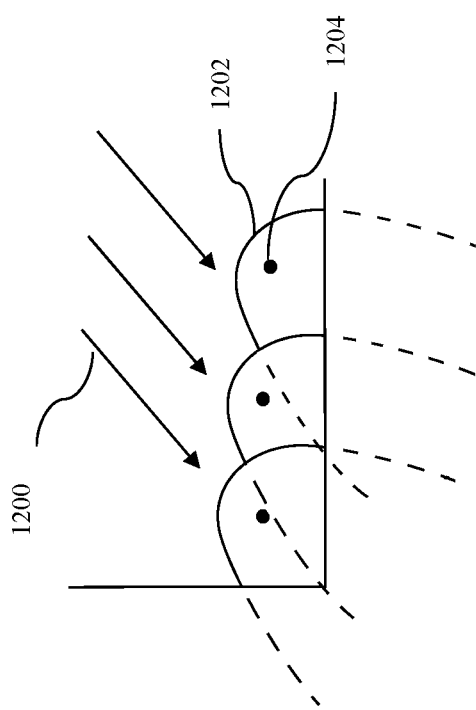
FIG. 12 is a diagram of a portion of a cross-section of an example segmented reflector with parabolic segments for use in the wearable augmented reality apparatus in accordance with some embodiments.

FIG. 12 depicts a cross-section of an example implementation of a portion of segmented reflector 910 as shown in FIG. 9 with reflective parabolic segments like segment 1202. In accordance with some embodiments, parabolic segments like 1202 may be oriented such that incident rays 1200 may all be parallel to the geometric axis of segment 1202. By the parabolic law of reflection, rays that strike segment 1202 may be reflected such that resultant rays may all be back-traced to the geometric focus of segment 1202, focus 1204. Similar to the reflector shown in FIG. 10, having a grid of many small segments like segment 1202 may transform a beam of collimated incident light into an effective real image.

The cross-sections shown in FIGS. 10-12 are shown in two dimensions with segments repeating along one axis. However, one should understand that the respective reflectors include a grid of segments that may also repeat along an axis perpendicular to that shown in FIGS. 10-12, such as depicted in the top-down view shown in FIG. 10.

Figure 13:
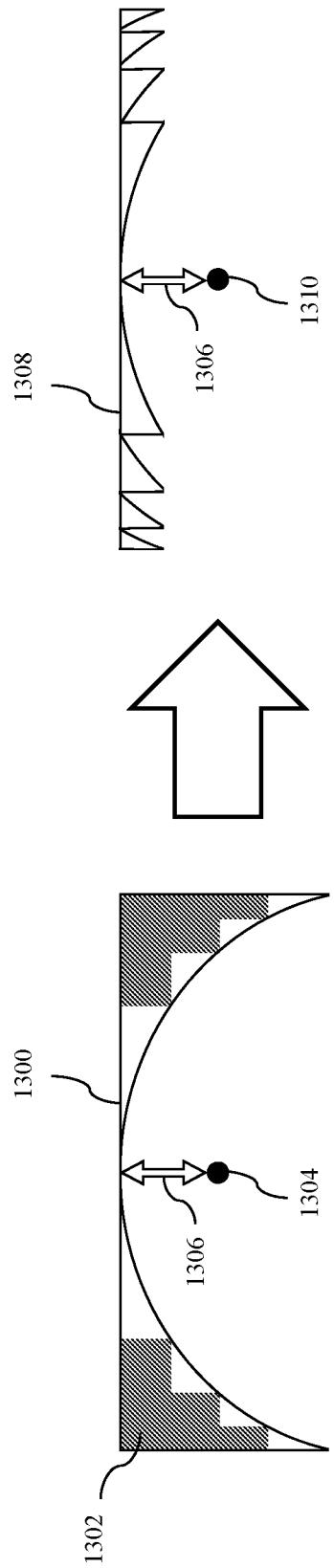
FIG. 13 is a diagram of cross-sections of example Fresnel reflectors.

FIG. 13 shows visual examples of cross-sections of how Fresnel reflectors may be constructed. As seen in FIG. 13, space 1302 in a curved reflector 1300, which has focus 1304, may be eliminated to create much flatter reflector 1308 such that new focus 1310 may be approximately the same distance 1306 to the base of reflector 1308 as focus 1304 is to reflector 1300. As such, the reflector 1306 can substitute for reflector 1300 and provide relatively minimal optical distortion.

Figure 14:
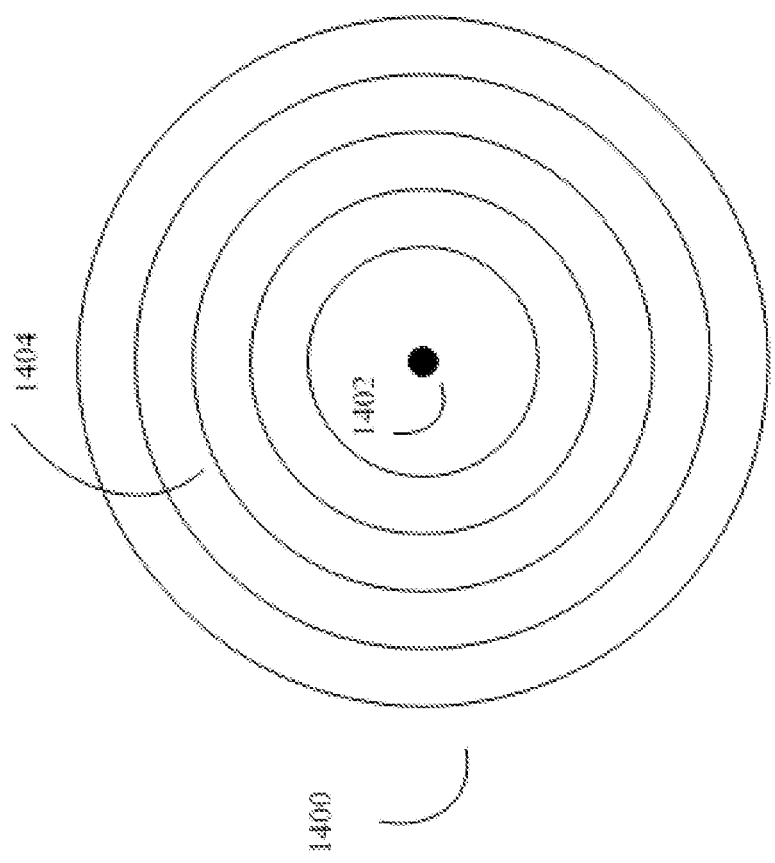
FIG. 14 is a diagram of a cross-section and a top-down view of another example of a Fresnel reflector.
Figure 14:
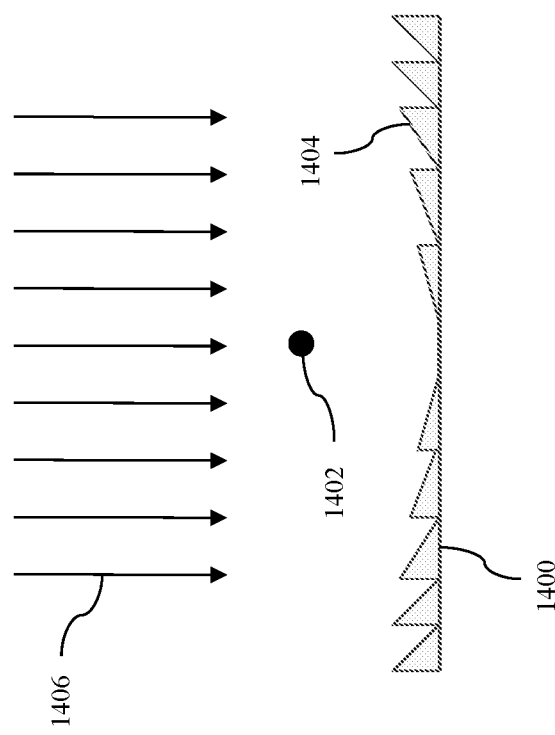

FIG. 14 shows an alternate version of a cross-section and a top-down view of a Fresnel reflector 1400, which may be comprised of segments like segment 1404, which may all be oriented such that all parallel light rays 1406 that hit Fresnel reflector 1400 may all be reflected to pass through point 1402. As depicted in FIG. 14, the parallel rays 1406 may be perpendicular to the base of Fresnel reflector 1400, but in alternative embodiments, parallel rays 1406 may not be perpendicular to the base of Fresnel reflector 1400. A Fresnel reflector in three-dimensional space, such as one corresponding to the example cross-sections depicted in FIGS. 13 and 14, may comprise a plurality of concentric circular segments, such as segment 1404, as shown in the top-down view in FIG. 14. Although the top-down view in FIG. 14 depicts Fresnel reflector 1400 as having a circular base, the base of Fresnel reflector 1400 need not be circular.

One of ordinary skill in the art should recognize that the number of segments depicted in the reflectors shown in FIGS. 10-14 is not meant to be limiting.

Figure 15:
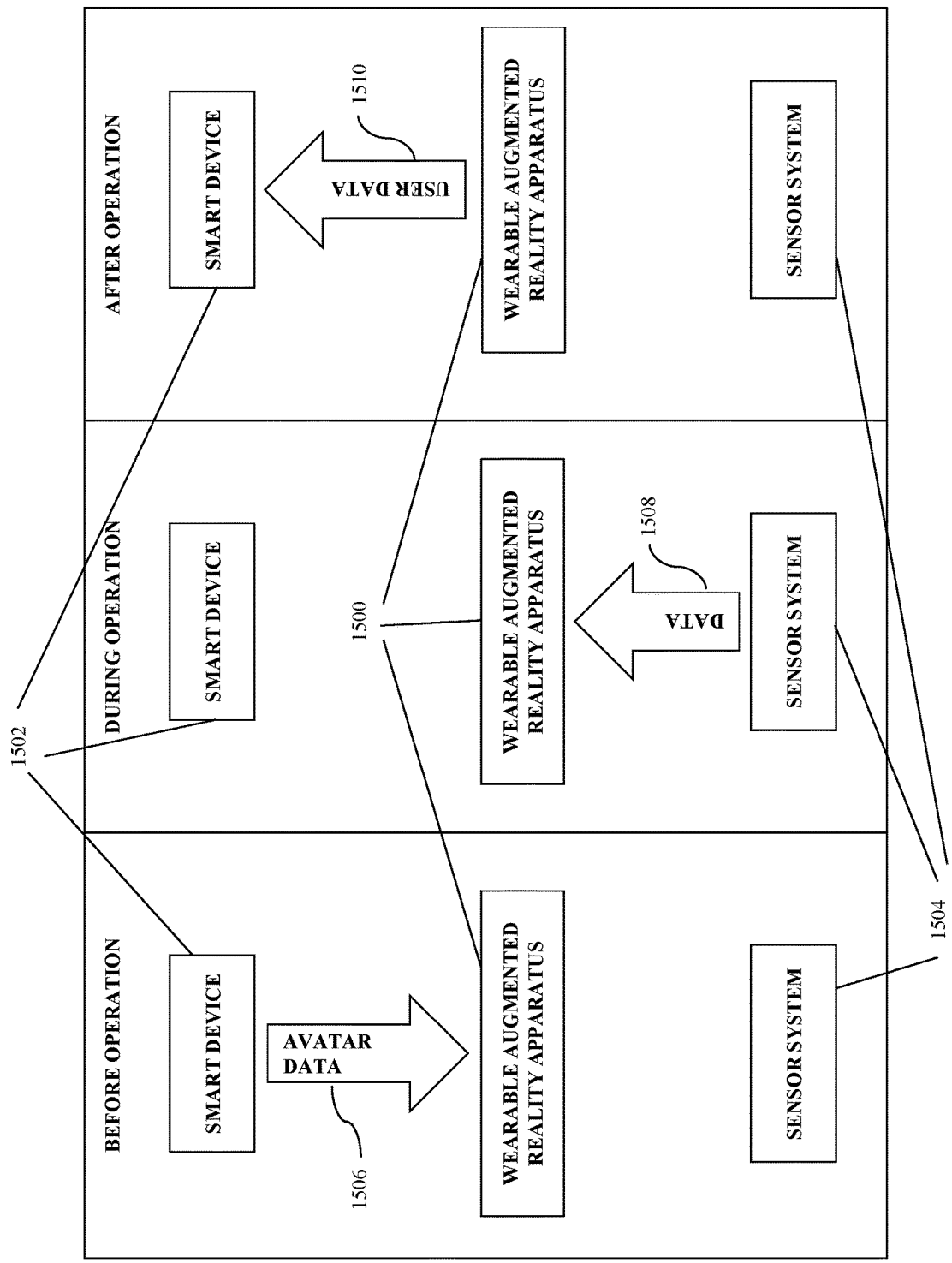
FIG. 15 is a block diagram of examples of data transfers between the smart device, wearable augmented reality apparatus, and sensor system in accordance with some embodiments.

FIG. 15 shows a block diagram of examples of transfers of data between smart device 1502, wearable augmented reality apparatus 1500, and sensor system 1504 in accordance with some embodiments. As shown in FIG. 15, in accordance with some embodiments, before operation of wearable augmented reality apparatus 1500, sensor system 1504 may be inactive, and smart device 1502 may send avatar data 1506 to wearable augmented reality apparatus 1500, where data 1506 may be stored in the processor and/or in memory or storage of wearable augmented reality apparatus 1500. In some embodiments, avatar data 1506 may contain information regarding the avatar's path and speed in world space. In some embodiments, wearable augmented reality apparatus 1500 may be able to operate without the initial transfer of avatar data 1506 from smart device 1502.

As shown in FIG. 15, during operation of wearable augmented reality apparatus 1500, there may be no transfer of data between smart device 1502 and wearable augmented reality apparatus 1500, and wearable augmented reality apparatus 1500 may combine data 1508 from its internal sensor system 1504 with stored avatar data 1506 to generate a holographic avatar that follows a predictable path and speed as interpreted by a user of wearable augmented reality apparatus 1500.

In accordance with some embodiments, after operation of wearable augmented reality apparatus 1500, wearable augmented reality apparatus 1500 may send user data 1510 collected during operation to smart device 1502. In accordance with some embodiments, smart device 1502 may use user data 1510 and data from previous operations to subsequently generate a holographic avatar that pushes a user of wearable augmented reality apparatus 1500 to improve.

Figure 16:
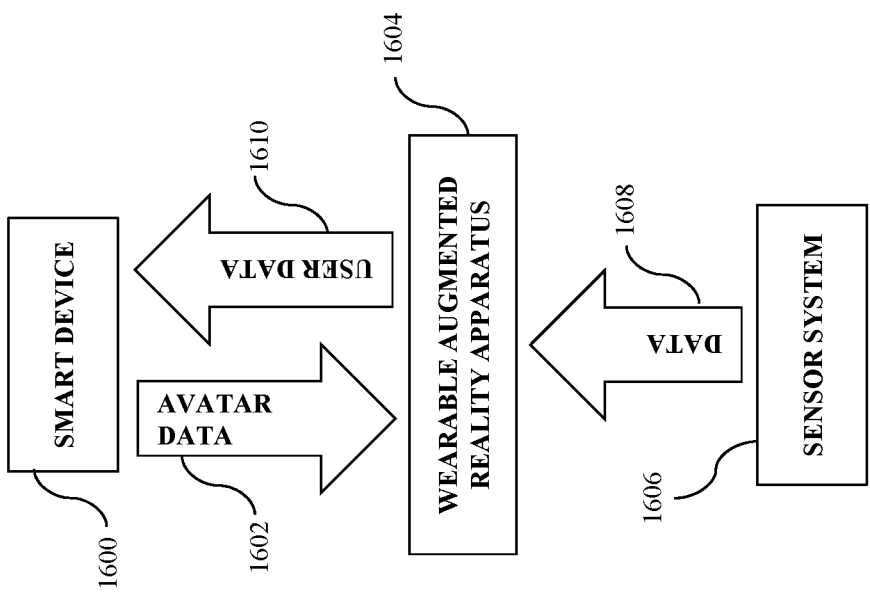
FIG. 16 is a block diagram of an example of concurrent data transfers between the smart device, wearable augmented reality apparatus, and sensor system in accordance with some embodiments.

As shown in FIG. 16, in accordance with some embodiments, one or more data transfers between smart device 1600, wearable augmented reality device 1604, and sensor system 1606 may happen concurrently. In accordance with some embodiments, wearable augmented reality device 1604 may stream user data 1610, which may contain information from data 1608, to smart device 1600. In accordance with some embodiments, wearable augmented reality device 1604 may also concurrently receive avatar data 1602 from smart device 1600, which may, in a real-time or near real-time fashion, alter the position and orientation of the avatar as perceived by the user.

It should be understood that many variations are possible based on the disclosure herein. Although features and elements are described above in particular combinations, each feature or element can be used alone without the other features and elements or in various combinations with or without other features and elements.

What is claimed is:

1. A wearable augmented reality apparatus comprising:
    a processor operationally coupled to one or more sensors;
    an optical engine operationally coupled to the processor;
    an optical system operationally coupled to the optical engine, wherein the optical system contains at least one waveguide which contains at least one Fresnel reflector;
    the processor being configured to control the optical engine to adjust the perceived position of at least one virtual avatar based at least in part on data received from the one or more sensors.

2. The wearable augmented reality apparatus of claim 1, wherein the optical system contains at least one Fresnel lens.

3. The wearable augmented reality apparatus of claim 1, wherein the Fresnel reflector has parabolic segments.

4. The wearable augmented reality apparatus of claim 3, wherein the optical system includes at least one Fresnel lens.

5. The wearable augmented reality apparatus of claim 1, further comprising at least one speaker configured to output stored audio clips related to the performance of a user of the wearable augmented reality apparatus during a workout.

6. The wearable augmented reality apparatus of claim 5, wherein the at least one speaker is a bone conduction speaker.

7. The wearable augmented reality apparatus of claim 1, wherein the one or more sensors include at least one infrared (IR) sensor.

8. The wearable augmented reality apparatus of claim 7, wherein the IR sensor is configured to send data that includes a position of one or more infrared-emitting devices relative to the wearable augmented reality apparatus.

9. The wearable augmented reality apparatus of claim 7, wherein the IR sensor is used to determine the distance between the wearable augmented reality apparatus and external objects.

10. The wearable augmented reality apparatus of claim 1, wherein the optical system contains at least one prism.

11. A wearable augmented reality apparatus comprising:
    position sensors, the position sensors including an inertial measurement unit (IMU) and a global positioning system (GPS) unit;
    a processor configured to:
        receive position data from the IMU and the GPS unit; and
        receive data from an external smart device, wherein the data includes predetermined altitude data associated with GPS points along a pre-defined path of a workout;
    a microdisplay configured to form an image; and
    a light guidance system configured to guide light from the image to produce a virtual image at a distance in front of an eye of a wearer of the wearable augmented reality apparatus to create the avatar at a perceived position superimposed on a field of vision of the wearer;
    wherein the processor is further configured to:
        determine a position of the wearer as a function of the position data; and
        adjust the perceived position of the avatar based on a pre-defined physical fitness goal.

12. The wearable augmented reality apparatus of claim 11, further comprising at least one IR sensor.

13. The wearable augmented reality apparatus of claim 12, wherein the IR sensor is configured to output data that includes a respective distance between the wearable augmented reality apparatus and each external object of one or more external objects.

14. The wearable augmented reality apparatus of claim 11, further comprising at least one heart rate sensor.

15. The wearable augmented reality apparatus of claim 14, wherein a perceived speed of the avatar produced is modified at least in part based on the heart rate of a user of the wearable augmented reality apparatus.

16. The wearable augmented reality apparatus of claim 11, wherein data received from the external smart device includes a perceived speed setting for the avatar extrapolated from previous workout data.

* * * * *